(12) United States Patent
Jang et al.

(10) Patent No.: US 10,195,638 B2
(45) Date of Patent: Feb. 5, 2019

(54) APPARATUS FOR COATING A SEPARATOR HAVING COLLECTION CHAMBER AND METHOD FOR COATING THE SEPARATOR

(71) Applicant: SAMSUNG SDI CO., LTD., Yongin-si, Gyeonggi-do (KR)

(72) Inventors: Woo Jin Jang, Suwon-si (KR); Yun Gi Kim, Suwon-si (KR); Jin Kyu Park, Suwon-si (KR); Sang Ho Lee, Suwon-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 315 days.

(21) Appl. No.: 14/527,118

(22) Filed: Oct. 29, 2014

(65) Prior Publication Data

US 2015/0118389 A1   Apr. 30, 2015

(30) Foreign Application Priority Data

Oct. 30, 2013 (KR) .................... 10-2013-0129663
Oct. 13, 2014 (KR) .................... 10-2014-0137419

(51) Int. Cl.
| | |
|---|---|
| *B05C 1/08* | (2006.01) |
| *H01M 2/14* | (2006.01) |
| *H01M 2/16* | (2006.01) |
| *B05C 11/04* | (2006.01) |
| *B05C 11/10* | (2006.01) |

(52) U.S. Cl.
CPC ........ *B05C 11/1039* (2013.01); *B05C 1/0813* (2013.01); *B05C 1/0817* (2013.01); *B05C 1/0826* (2013.01); *B05C 11/04* (2013.01); *H01M 2/145* (2013.01); *H01M 2/1686* (2013.01)

(58) Field of Classification Search
CPC .............................. B05C 1/0826; B05C 11/10
See application file for complete search history.

(56) References Cited

U.S. PATENT DOCUMENTS 3,025,828 A * 3/1962 Heilman ................. B05C 11/11
                                                                118/419
3,492,840 A * 2/1970 Korsch .................. D06B 1/142
                                                                118/258

(Continued)

FOREIGN PATENT DOCUMENTS

| CN | 1576214 A | 2/2005 |
|---|---|---|
| JP | 11-197569 A | 7/1999 |

(Continued)

OTHER PUBLICATIONS

Chinese Office Action dated Jan. 19, 2018, of the corresponding Chinese Patent Application No. 201480071474.3.

*Primary Examiner* — Karl Kurple
(74) *Attorney, Agent, or Firm* — Lee & Morse P.C.

(57) ABSTRACT

Provided are an apparatus and method for coating a separator. The method includes supplying a coating solution to a receiving chamber; applying the coating solution received in the receiving chamber to a surface of the separator through a coating bar; collecting coating solution overflowing the receiving chamber by a collection chamber surrounding the receiving chamber; and returning coating solution from the collection chamber to the receiving chamber through a return line.

14 Claims, 3 Drawing Sheets

(56) References Cited

U.S. PATENT DOCUMENTS

| | | | | |
|---|---|---|---|---|
| 3,722,453 | A * | 3/1973 | Dahlquist | G03G 15/101 118/246 |
| 3,759,220 | A * | 9/1973 | Saito | G03G 21/0088 101/157 |
| 3,863,600 | A * | 2/1975 | Van Regenmortel | G03C 1/74 118/419 |
| 4,675,208 | A * | 6/1987 | Kageyama | B05C 1/0813 118/259 |
| 4,982,687 | A * | 1/1991 | Takahashi | B05C 5/0254 118/410 |
| 5,302,203 | A * | 4/1994 | Zimmer | B05C 11/025 100/168 |
| 5,628,827 | A * | 5/1997 | McCollam | B05C 1/0813 118/261 |
| 5,633,045 | A * | 5/1997 | Smith | B05C 1/0813 118/244 |
| 5,660,631 | A * | 8/1997 | Eriksson | B05C 1/0817 118/106 |
| 5,795,357 | A * | 8/1998 | Kim | B05C 1/0826 118/249 |
| 6,138,559 | A * | 10/2000 | Zimmer | D06B 15/02 100/160 |
| 6,197,113 | B1 * | 3/2001 | Zimmer | B05C 1/0813 118/249 |
| 6,464,813 | B1 * | 10/2002 | McQuaid | B05C 1/0813 118/255 |
| 7,204,883 | B2 * | 4/2007 | Rizzoli | A24C 5/472 118/202 |
| 8,132,527 | B2 * | 3/2012 | Imamura | B05C 3/20 118/404 |
| 8,506,709 | B2 * | 8/2013 | Ryabova | B01F 5/10 118/262 |
| 8,667,927 | B2 * | 3/2014 | Dupertuis | B05D 1/002 118/261 |
| 8,764,181 | B2 * | 7/2014 | Suzuki | G03G 15/104 101/350.5 |
| 2002/0189538 | A1 * | 12/2002 | Swoboda | D21H 25/12 118/230 |
| 2009/0092742 | A1 * | 4/2009 | Teramoto | B05C 1/0826 427/9 |
| 2010/0189916 | A1 * | 7/2010 | Watanabe | B05C 5/002 427/512 |
| 2013/0224383 | A1 * | 8/2013 | L'Heureux | B05B 15/045 427/282 |
| 2015/0128820 | A1 * | 5/2015 | Masgrau Lagresa | B41F 31/02 101/350.6 |

FOREIGN PATENT DOCUMENTS

| | | |
|---|---|---|
| JP | 2010-284652 A | 12/2010 |
| JP | 2011245448 A | 12/2011 |
| JP | 2012-179552 A | 9/2012 |
| KR | 10-2011-0100529 A | 9/2011 |

* cited by examiner

APPARATUS FOR COATING A SEPARATOR HAVING COLLECTION CHAMBER AND METHOD FOR COATING THE SEPARATOR

CROSS-REFERENCE TO RELATED APPLICATIONS

Korean Patent Application No. 10-2013-0129663, filed on Oct. 30, 2013 and Korean Patent Application No. 10-2014-0137419, filed on Oct. 13, 2014, in Korean Intellectual Property Office, and entitled: "Apparatus and Method for Coating Separator," are incorporated by reference herein in their entireties.

BACKGROUND

1. Field

Embodiments relate to an apparatus and method for coating a separator for secondary batteries.

2. Description of the Related Art

Separators used for secondary batteries may be porous films fabricated by uniaxially or biaxially orienting a polyolefin polymer such as polyethylene and polypropylene. The heat resistance of separators may be increased using a method of adding inorganic materials having high heat resistance to a separator, a method of fabricating a separator using materials having high heat resistance, or a method of coating one or both sides of a prefabricated polyolefin porous separator with inorganic particles having heat resistance. Heat resistant layers for increasing heat resistance may be formed by lamination, co-extrusion, or coating.

SUMMARY

Embodiments may be realized by providing a method of coating a separator, including supplying a coating solution to a receiving chamber; applying the coating solution received in the receiving chamber to a surface of the separator through a coating bar; collecting coating solution overflowing the receiving chamber by a collection chamber surrounding the receiving chamber; and returning coating solution from the collection chamber to the receiving chamber through a return line.

The receiving chamber and the collection chamber may be sealed to prevent the coating solution from being exposed to an outside thereof.

The coating bar may include a wire wound around a cylindrical bar.

The coating bar may include a plurality of depressions formed on a surface of a cylindrical bar.

The coating solution may be supplied to the receiving chamber through a supply line extending from a storage tank storing the coating solution to the receiving chamber, and the return line may extend from the collection chamber to the supply line.

The coating solution may be supplied to the receiving chamber through a supply line extending from a storage tank storing the coating solution to the receiving chamber, and coating solution collected in the collection chamber may flow into the storage tank through the return line extending from the collection chamber to the storage tank and may return to the receiving chamber through the supply line.

An inner doctor knife may be provided at an upper end of the receiving chamber and an outer doctor knife may be provided at an upper end of the collection chamber to prevent exposure of the coating solution to an outside of the receiving chamber and the collection chamber.

Embodiments may be realized by providing an apparatus for coating a separator, including a receiving chamber receiving a coating solution; a coating bar applying the coating solution received in the receiving chamber to a surface of the separator; a collection chamber surrounding the receiving chamber and collecting coating solution overflowing the receiving chamber; and a return line for returning coating solution collected in the collection chamber to the receiving chamber.

The coating bar may include a wire wound around a cylindrical bar.

The coating bar may include a plurality of depressions formed on a surface of a cylindrical bar.

The apparatus may further include a storage tank storing a coating solution; and a supply line extending from the storage tank to the receiving chamber and supplying coating solution stored in the storage tank to the receiving chamber.

The return line may extend from the collection chamber to the supply line, and coating solution collected in the collection chamber may return to the receiving chamber through the return line and the supply line.

The return line may extend from the collection chamber to the storage tank and coating solution collected in the collection chamber may flow into the storage tank through the return line and then may return to the receiving chamber through the supply line.

The apparatus may further include an inner doctor knife provided at an upper end of the receiving chamber to prevent exposure of the coating solution to an outside of the receiving chamber.

The apparatus may further include an outer doctor knife provided at an upper end of the collection chamber to prevent exposure of the coating solution to an outside of the collection chamber.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
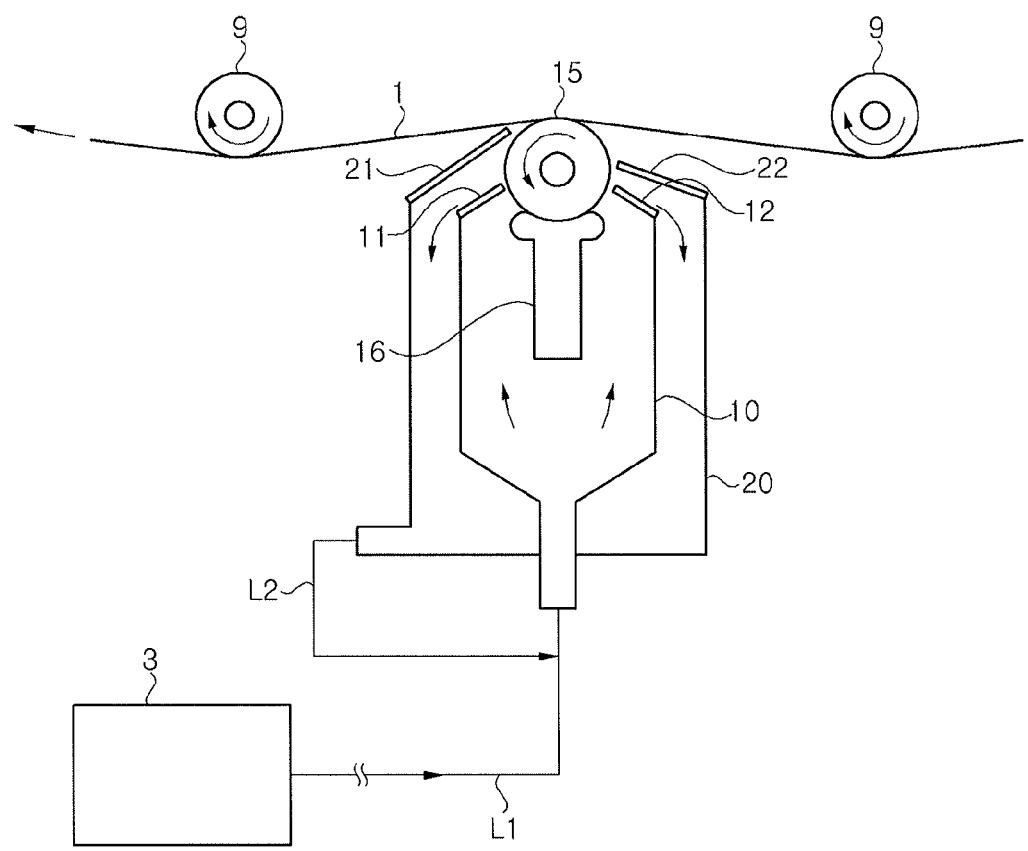
FIG. 1 schematically illustrates an apparatus for coating a separator according to a first embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, apparatuses and methods for coating a separator according to embodiments will be described in detail with reference to the accompanying drawings. For example, in the following description, the apparatuses and methods for coating a separator according to embodiments are described as being applied to a process of coating a separator for secondary batteries. However, it should be understood that embodiments may also be applied to coating of various types of sheet materials in addition to the separator.

Figure 2:
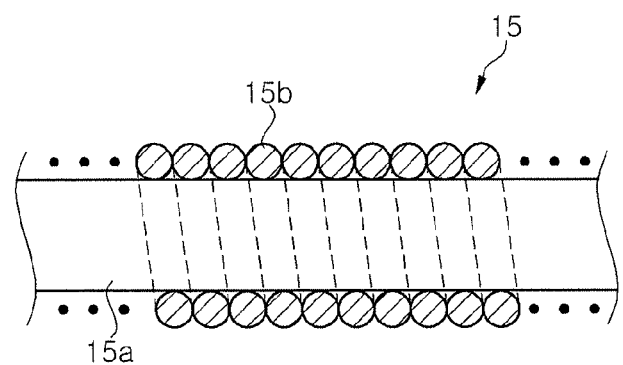
FIG. 2 illustrates an enlarged view of major parts of a coating bar included in the apparatus for coating a separator according to the first embodiment.

An apparatus and method for coating a separator according to a first embodiment will be described below with reference to FIGS. 1 to 3. Referring to FIG. 1, the apparatus according to the first embodiment may include a receiving chamber 10 receiving a coating solution to be coated onto a separator 1, a coating bar 15 disposed to apply the coating solution received in the receiving chamber 10 to the sheet-shaped material, namely, the separator 1, which is being transferred, and a collection chamber 20 surrounding the receiving chamber 10 and collecting the coating solution overflowing the receiving chamber 10.

As used herein, the expression "the collection chamber 20 surrounds the receiving chamber 10" means not only that the collection chamber 20 completely encloses the receiving chamber 10 in all directions, but also that the collection chamber 20 is configured to collect at least a portion of a coating solution overflowing the receiving chamber 10.

As used herein, the term "separator" means an intermediate membrane that enables a battery to be recharged and discharged by consistently maintaining ionic conductivity while separating an anode from a cathode within the battery. Other types of membranes in addition to polyolefin materials may be used as the separator.

A coating solution may be an organic coating solution or an organic-inorganic mixed coating solution used to form a coating layer in manufacture of a separator, and may contain an organic polymer resin, or an organic binder polymer resin and inorganic particles, together with a suitable solvent and other additives. In the preparation of the coating solution, an organic binder polymer resin and inorganic particles may be mixed with each other in a liquid state (i.e., a polymer solution and an inorganic dispersion solution) in which the organic binder polymer resin and the inorganic particles are dissolved in proper solvents, respectively.

The receiving chamber 10 may be replenished with as much coating solution as that consumed during coating, through a supply line L1 extending from a storage tank 3 storing the coating solution in the receiving chamber 10.

The receiving chamber 10 may be provided with a rotatable coating bar 15 and a bar holder 16 to support the coating bar 15. The coating bar 15 may be provided to the receiving chamber such that one portion thereof is dipped in the coating solution.

The separator 1 may be transferred while contacting the coating bar 15, which is rotating. The coating apparatus may be provided at opposite sides thereof with rollers 9 that press the separator 1 at an opposite side of the coating bar 15, and the separator 1 may be brought into contact with the coating bar 15 at a predetermined pressure.

The receiving chamber 10 functioning as an inner chamber may be provided at an upper end thereof with inner doctor knives (or doctor blades) 11, 12. The inner doctor knives 11, 12 may be provided at the upper end of the receiving chamber 10 to face each other and extend toward the coating bar 15 from the upper end of the receiving chamber 10. The inner doctor knives 11, 12 may remove a superfluous coating solution from the coating bar 15 to prevent the coating solution on the rotating coating bar 15 from being excessively applied to the separator 1. The inner doctor knives 11, 12 may also prevent the coating solution received within the receiving chamber 10 from being exposed to the outside.

The inner doctor knives 11, 12 may be attached to the upper end of the receiving chamber 10 after being separately manufactured, or may be integrally formed with the receiving chamber 10 by deforming walls of the receiving chamber 10.

According to embodiments, the collection chamber 20 functioning as an outer chamber may be provided at an upper end thereof with outer doctor knives (or doctor blades) 21, 22. Like the inner doctor knives 11, 12, the outer doctor knives 21, 22 may be provided at the upper end of the collection chamber 20 to face each other and extend toward the coating bar 15 from the upper end of the collection chamber 20. The outer doctor knife 21 placed downstream (on the left in FIG. 1) in a transfer direction of the separator 1 may be directed toward a contact portion between the separator 1 and the coating bar 15, and the coating solution scattered or spattered upon separation of the separator 1 from the coating bar 15 may be collected.

Like the inner doctor knives 11, 12, the outer doctor knives 21, 22 may remove a superfluous coating solution from the coating bar 15 to prevent the coating solution on the rotatable coating bar 15 from being excessively applied to the separator 1. The outer doctor knives 21, 22 may also prevent the collected coating solution within the collection chamber 20 from being exposed to the outside.

Some of the coating solution supplied to the receiving chamber 10 may overflow the receiving chamber 10 as coating is performed on the separator 1, and the overflowing coating solution may be collected by the collection chamber 20 surrounding the receiving chamber 10. The inner doctor knives at the upper end of the receiving chamber 10 may prevent the coating solution received in the receiving chamber 10 from being exposed to the outside, and the outer doctor knives at the upper end of the collection chamber 20 may prevent the collected coating solution in the collection chamber 20 from being exposed to the outside, and variation in compositions of the coating solution, for example, due to solvent volatilization, may be prevented.

A return line L2 may extend from the collection chamber 20 to the supply line L1 so as to reuse the coating solution collected by the collection chamber 20.

The coating solution collected by the collection chamber 20 may be transferred to the supply line L1 through the return line L2, mixed with the coating solution supplied to the receiving chamber 10 through the supply line L1, and then returned to the receiving chamber 10. Although not shown in FIG. 1, pumps for transferring coating solutions may be provided to the supply line L1 and the return line L2.

According to the first embodiment, the return line L2 may not be connected to the storage tank 3 but to the supply line L1 between the storage tank 3 and the receiving chamber 10, the return line L2 may be made shorter in length, and the coating solution collected may be rapidly returned to the receiving chamber 10 for reuse. Sedimentation of solid matter may be reduced while the coating solution is being transferred through the return line L2, and compositions of the coating solution may be kept constant.

The supplied coating solution may not be exposed to the outside and may not exhibit a change in composition thereof during coating, and uniform products may be manufactured from start to finish. The coating solution may be circulated in the coating apparatus, and may be utilized until completely used up instead of being discharged.

A wire bar formed by densely winding a wire around a cylindrical bar, or a smooth cylindrical bar around which the wire is not wound may be used as the coating bar 15 used to apply the coating solution to the separator 1. As shown in FIG. 2, the coating bar 15 may include a cylindrical bar 15a and a wire 15b having a diameter of about 0.1 mm to about 1 mm and wound around the cylindrical bar 15a.

Figure 3:
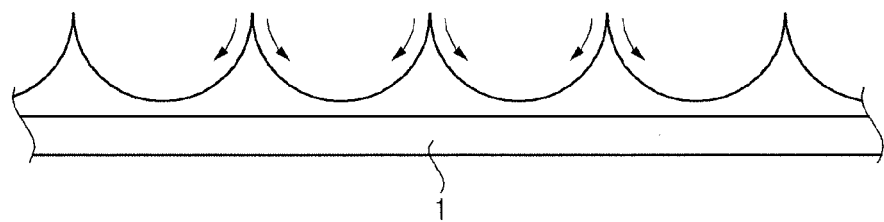
FIG. 3 illustrates a state of a coating solution immediately after the coating solution is applied to a surface of a separator by a coating bar.

When the wire bar is used as the coating bar 15, the coating solution applied to the surface of the separator 1 may be rapidly flattened, despite an initial shape thereof similar to a sharp mountain, as shown in FIG. 3. The use of the wire bar may enable the applied amount of the coating solution with respect to the separator to be uniformly maintained.

For the wire bar, the diameter of the cylindrical bar, and a diameter and the number of turns of the wire may be adjusted depending upon viscosity of the coating solution and the thickness of the coating layer. When the cylindrical bar has a constant diameter, the number of turns increases with decreasing wire diameter and decreases with increasing wire diameter.

Hereinafter, an apparatus for coating a separator according to a second embodiment will be described with reference to FIG. 4.

Figure 4:
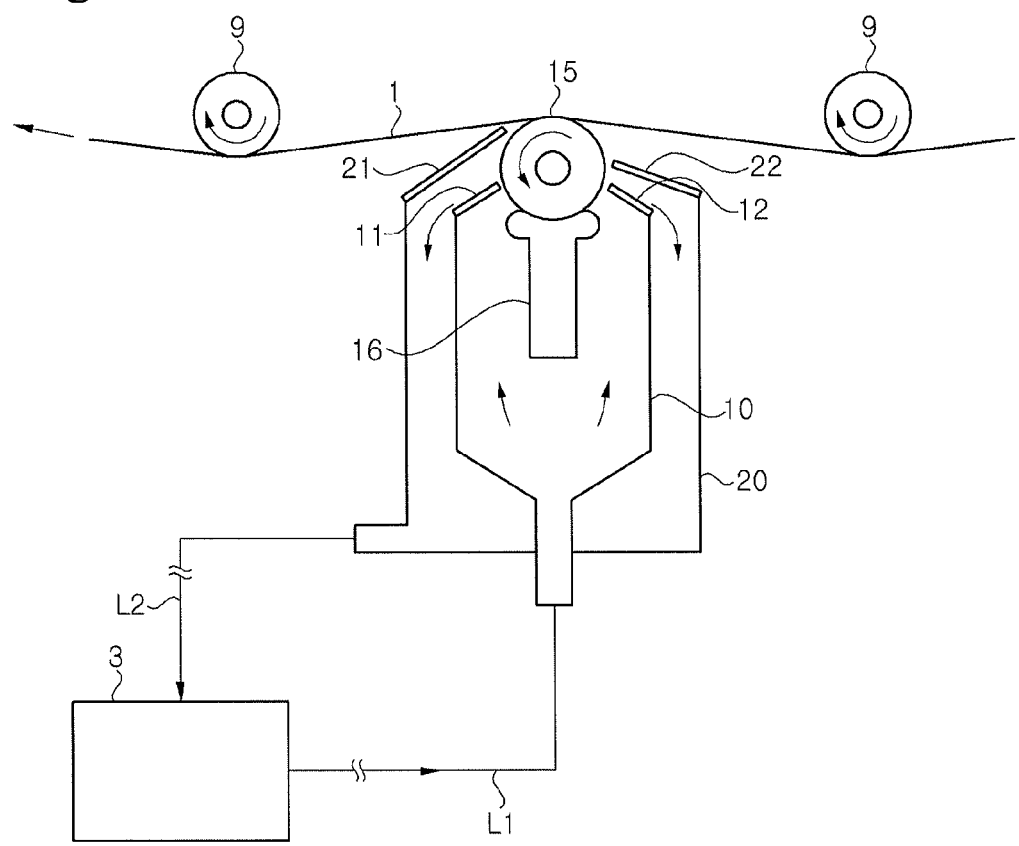
FIG. 4 schematically illustrates an apparatus for coating a separator according to a second embodiment.

Referring to FIG. 4, as in the first embodiment described above, the apparatus for coating a separator according to the second embodiment may include a receiving chamber 10 receiving a coating solution to be coated onto a separator 1, a coating bar 15 disposed to apply the coating solution received in the receiving chamber 10 to the sheet-shaped material, namely, the separator 1, which is being transferred, and a collection chamber 20 surrounding the receiving chamber 10 and collecting the coating solution overflowing the receiving chamber 10.

The receiving chamber 10 may be replenished with as much coating solution as that consumed during coating, through a supply line L1 extending from a storage tank 3 storing the coating solution to the receiving chamber 10.

Unlike the first embodiment, the separator coating apparatus according to the second embodiment may include a return line L2 extending from the collection chamber 20 to the storage tank 3 so as to reuse the coating solution collected by the collection chamber 20.

According to the second embodiment, the coating solution collected by the collection chamber 20 may be introduced into the storage tank 3 through the return line L2 and mixed with the coating solution stored in the storage tank 3. Then, the mixed coating solution may return to the receiving chamber 10 together with the coating solution supplied from the storage tank 3 through the supply line L1 to the receiving chamber 10 Although not shown in FIG. 4, pumps for transferring coating solutions may be provided to the supply line L1 and the return line L2.

Hereinafter, an apparatus for coating a separator according to a third embodiment will be described with reference to FIG. 5.

Figure 5:
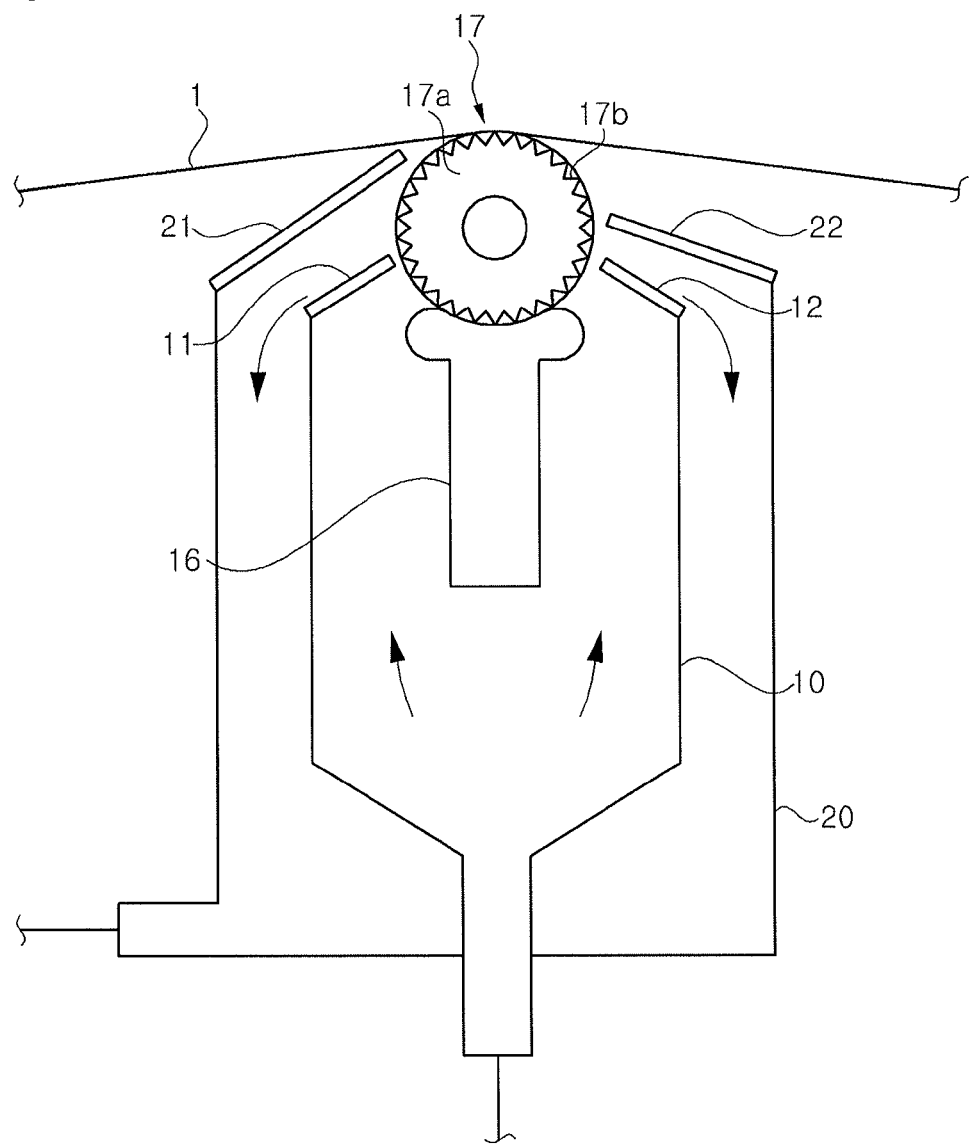
FIG. 5 schematically illustrates an apparatus for coating a separator according to a third embodiment.

Referring to FIG. 5, as in the first embodiment described above, the apparatus for coating a separator according to the third embodiment may include a receiving chamber 10 receiving a coating solution to be coated onto a separator 1, a coating bar 17 disposed to apply the coating solution received in the receiving chamber 10 to the sheet-shaped material, namely, the separator 1, which is being transferred, and a collection chamber 20 surrounding the receiving chamber 10 and collecting the coating solution overflowing the receiving chamber 10.

Unlike the separator coating apparatus according to the first embodiment that uses the wire bar, in which the wire 15b is wound around the cylindrical bar 15a, as the coating bar 15, the separator coating apparatus according to the third embodiment uses a coating bar, for example, a mesh bar, in which a plurality of depressions 17b having a quadrangular pyramidal shape is formed on a surface of a cylindrical bar 17a.

As in the first and second embodiments, the receiving chamber 10 may be replenished with as much coating solution as that consumed during coating, through a supply line L1 extending from a storage tank 3 storing the coating solution to the receiving chamber 10.

The separator coating apparatus according to the third embodiment may be configured such that a return line L2 for reusing the coating solution collected by the collection chamber 20 is connected to the supply line L1 between the storage tank 3 and the receiving chamber 10 as in the first embodiment, or to the storage tank 3 as in the second embodiment.

Next, operations of the coating apparatuses according to embodiments will be described with reference to FIGS. 1 to 5.

As shown in FIGS. 1, 4, and 5, the coating apparatuses according to embodiments supply the coating solution stored in the storage tank 3 to the receiving chamber 10 through the supply line L1 and apply the coating solution received in the receiving chamber 10 to a surface of a separator 1 through the coating bar 15 or 17.

According to the coating method in embodiments, the coating solution overflowing the receiving chamber 10, for example, due to excess supply from the storage tank 3, may be collected by the collection chamber 20 surrounding the receiving chamber 10, and the collected coating solution may return to the receiving chamber 10 through the return line L2.

In the process of collecting and returning the coating solution to the receiving chamber 10, not only the receiving chamber 10 but also the collection chamber 20 may be sealed to maintain compositions of the coating solution. That is, both the receiving chamber 10 and the collection chamber 20 may be sealed to prevent the coating solution from being exposed to the outside.

The inner doctor knives 11, 12 may be provided at the upper end of the receiving chamber 10 and the outer doctor knives 21, 22 may be provided at the upper end of the collection chamber 20, and the receiving chamber 10 and the collection chamber 20 may be sealed.

A mesh bar (i.e., a gravure roll) or a wire bar may be used as the coating bar 15 or 17 applying the coating solution to the surface of the separator 1, and when the wire bar is used, it may be possible to uniformly maintain the amount of coating solution applied to the separator.

The return line L2 may extend from the collection chamber 20 and be connected to the supply line L1 or the storage tank 3. When the return line L2 is directly connected to the supply line L1 without passing through the storage tank 3, the return line L2 may be made shorter in length, which may prevent sedimentation of solid matter, and the compositions of the coating solution may be kept uniform.

Embodiments may provide an apparatus and method for coating a separator, which may prevent variation in compositions of a coating solution despite reuse of the overflowing coating solution and may perform simple coating.

In the apparatus and method for coating a separator according to an embodiment, a collection chamber surrounds a receiving chamber receiving a coating solution used to coat a separator, and the coating solution overflowing the receiving chamber may be reused by returning to the receiving chamber through the collection chamber and a collection passage.

In the apparatus and method for coating a separator according to an embodiment, exposure of the coating solution to the outside may be prevented despite use of gravure coating allowing a simple coating process, and variation in compositions of the coating solution, for example, due to solvent volatilization, may be prevented, while allowing reuse of the overflowing coating solution without risk of composition variation.

By way of summation and review, examples of a coating method for separators may include a dip-coating method of simultaneously coating both sides of a separator, a gravure coating method of sequentially coating both sides of a separator, a die-coating method, and the like. Although the dip-coating method and the gravure coating method may allow simple coating, there may be problems in that a coating solution may be exposed to the outside during coating, and compositions of the coating solution may vary, for example, due to volatilization of a solvent. In the die-coating method, a coating solution may not be exposed to the outside before the start of coating, and compositions of the solution may not vary. The die-coating method may have disadvantages in that uniformity of a coating thickness may be difficult to maintain and a coating solution discharged from a die may be unable to be reused.

Embodiments are directed to an apparatus and method for coating a separator for secondary batteries. The apparatus and method may minimize volatilization of a solvent in coating heat resistant inorganic particles on a separator for secondary batteries, and variation in compositions of a coating solution may be prevented.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of coating a separator using an apparatus, comprising: supplying a coating solution to a receiving chamber having a side wall and a bottom; applying the coating solution received in the receiving chamber to a surface of the separator through a coating bar; collecting a portion of the coating solution overflowing the receiving chamber by a collection chamber, the collection chamber surrounding and enclosing the side wall of the receiving chamber; and returning the collected coating solution from the collection chamber to the receiving chamber through a return line, wherein said apparatus comprising: the receiving chamber having the side wall and the bottom, the receiving chamber configured to receive the coating solution; the coating bar configured to apply the coating solution received in the receiving chamber to the surface of the separator; the collection chamber surrounding and enclosing the side wall of the receiving chamber and configured to collect the portion of the coating solution overflowing the receiving chamber; a pair of outer doctor knives extending from upper ends of opposite side walls of the collection chamber to the coating bar such that exposure of the coating solution to an outside of the collection chamber is prevented;

an inner doctor knife provided at an upper end of the side wall of the receiving chamber to prevent exposure of the coating solution to an outside of the receiving chamber; and the collection chamber accommodates the receiving chamber, and the collection chamber surrounds the bottom of the receiving chamber;

and the return line configured to return the portion of the coating solution from the collection chamber to the receiving chamber.

2. The method as claimed in claim 1, wherein the receiving chamber and the collection chamber are sealed to prevent the coating solution from being exposed to an outside thereof.

3. The method as claimed in claim 1, wherein the coating bar includes a wire wound around a cylindrical bar.

4. The method as claimed in claim 1, wherein the coating bar includes a plurality of depressions formed on a surface of a cylindrical bar.

5. The method as claimed in claim 1, wherein:
the coating solution is supplied to the receiving chamber through a supply line extending from a storage tank storing the coating solution to the receiving chamber, and
the return line extends from the collection chamber to the supply line.

6. The method as claimed in claim 1, wherein:
the coating solution is supplied to the receiving chamber through a supply line extending from a storage tank storing the coating solution to the receiving chamber, and
the collected coating solution in the collection chamber flows into the storage tank through the return line extending from the collection chamber to the storage tank and returns to the receiving chamber through the supply line.

7. An apparatus for coating a separator, comprising: a receiving chamber having a side wall and a bottom, the receiving chamber to receive a coating solution; a coating bar to apply the coating solution received in the receiving chamber to a surface of the separator; a collection chamber surrounding and enclosing the side wall of the receiving chamber and to collect a portion of the coating solution overflowing the receiving chamber; a pair of outer doctor knives extending from upper ends of opposite side walls of the collection chamber to the coating bar such that exposure of the coating solution to an outside of the collection chamber is prevented;

an inner doctor knife provided at an upper end of the side wall of the receiving chamber to prevent exposure of the coating solution to an outside of the receiving chamber; and the collection chamber accommodates the receiving chamber, and the collection chamber surrounds the bottom of the receiving chamber;

and a return line to return the portion of the coating solution from the collection chamber to the receiving chamber.

8. The apparatus as claimed in claim 7, wherein the coating bar includes a wire wound around a cylindrical bar.

9. The apparatus as claimed in claim 7, wherein the coating bar includes a plurality of depressions formed on a surface of a cylindrical bar.

10. The apparatus as claimed in claim 7, further comprising:
- a storage tank to store the coating solution; and
- a supply line extending from the storage tank to the receiving chamber and to supply the coating solution stored in the storage tank to the receiving chamber.

11. The apparatus as claimed in claim 10, wherein:
- the return line extends from the collection chamber to the supply line, and
- the collected coating solution in the collection chamber returns to the receiving chamber through the return line and the supply line.

12. The apparatus as claimed in claim 10, wherein the return line extends from the collection chamber to the storage tank and the collected coating solution in the collection chamber flows into the storage tank through the return line and then returns to the receiving chamber through the supply line.

13. The apparatus as claimed in claim 7, wherein one of the pair of outer doctor knives is closer to the separator than another of the pair of outer doctor knives.

14. The apparatus as claimed in claim 13, wherein:
- the one of the pair of outer doctor knives is placed in a downstream direction of the coating solution on the coating bar, and
- the another of the pair of outer doctor knives is placed in an upstream direction of the coating solution on the coating bar.

\* \* \* \* \*